US012376598B2

(12) United States Patent
Kooima et al.

(10) Patent No.: US 12,376,598 B2
(45) Date of Patent: Aug. 5, 2025

(54) BRAIN AND SPINAL CORD REMOVAL DEVICE AND RELATED METHODS

(71) Applicants: Roger D. Kooima, Sioux Falls, SD (US); Cody Altena, Fairview, SD (US)

(72) Inventors: Roger D. Kooima, Sioux Falls, SD (US); Cody Altena, Fairview, SD (US)

(73) Assignee: R Kooima Consulting, LLC, Sioux Falls, SD (US)

( * ) Notice: Subject to any disclaimer, the term of this patent is extended or adjusted under 35 U.S.C. 154(b) by 57 days.

(21) Appl. No.: 18/303,526

(22) Filed: Apr. 19, 2023

(65) Prior Publication Data

US 2023/0329252 A1   Oct. 19, 2023

Related U.S. Application Data

(60) Provisional application No. 63/332,492, filed on Apr. 19, 2022.

(51) Int. Cl.
*A22B 5/00*   (2006.01)
*A22C 17/04*   (2006.01)
*B08B 3/02*   (2006.01)

(52) U.S. Cl.
CPC ............ *A22C 17/04* (2013.01); *A22B 5/0052* (2013.01); *B08B 3/02* (2013.01); *B08B 2203/0223* (2013.01)

(58) Field of Classification Search
CPC .............................. A22B 5/0052; A22B 5/201
USPC ........................... 452/64, 108, 152, 160, 173
See application file for complete search history.

(56) References Cited

U.S. PATENT DOCUMENTS

| | | | |
|---|---|---|---|
| 4,662,028 A * | 5/1987 | Leining | A22B 5/0052 452/160 |
| 4,785,588 A | 11/1988 | Woodward | |
| 5,181,878 A * | 1/1993 | Bekkers | A22C 21/06 452/109 |
| 6,011,987 A * | 1/2000 | Barnett | A61B 34/20 606/130 |
| 8,833,444 B2 | 9/2014 | McAfee et al. | |
| 9,943,205 B2 | 4/2018 | Letera | |
| 10,562,078 B2 | 2/2020 | Dehn | |
| 11,040,376 B2 | 6/2021 | Dehn | |
| 2004/0106368 A1* | 6/2004 | Johnson | A22B 5/201 452/198 |
| 2004/0211067 A1* | 10/2004 | Whited | B26B 25/002 30/276 |
| 2004/0248510 A1* | 12/2004 | Ono | A22B 5/201 452/155 |

FOREIGN PATENT DOCUMENTS

| | | | | |
|---|---|---|---|---|
| DE | 10217195 | * | 10/2003 | |
| DE | 10217195 C1 | * | 10/2003 | ........... A22B 5/0005 |
| JP | 2002176907 A | | 6/2002 | |

(Continued)

*Primary Examiner* — David J Parsley
(74) *Attorney, Agent, or Firm* — Fredrikson & Byron, P.A.

(57) ABSTRACT

A spinal cord removal device including a suction tool including a tube, a high-pressure water hose connected to a water source, and a jetter nozzle attached to one end of the high-pressure water hose. The device is inserted into a cranial cavity or spinal cavity of an animal. When water is supplied to the device, water can break up the brain material or spinal material, flushing and cleaning the spinal cavity and cranial cavity.

17 Claims, 5 Drawing Sheets

(56) References Cited

FOREIGN PATENT DOCUMENTS

| | | | |
|---|---|---|---|
| JP | 2003144042 A | | 5/2003 |
| JP | 3115408 U | | 11/2005 |
| SU | 662099 | * | 5/1979 |

* cited by examiner

BRAIN AND SPINAL CORD REMOVAL DEVICE AND RELATED METHODS

CROSS-REFERENCE TO RELATED APPLICATION(S)

This application claims the benefit under 35 U.S.C. § 119(e) to U.S. Provisional Application 63/332,492, filed Apr. 19, 2022, and entitled "Method for Removing a Spinal Cord from a Deceased Animal," which is hereby incorporated herein by reference in its entirety.

TECHNICAL FIELD

The disclosure relates to processing deceased animals. More specifically, this disclosure relates to devices and methods for processing cattle carcasses.

BACKGROUND

In many livestock rendering facilities, deceased animals are rendered into product for feed or fertilizer. However, cattle that were 30 months of age or older at the time of their deaths must have their spinal cord and brain removed before the deceased animal is able to be processed. The FDA has promulgated requirements necessary for processing cattle, including the age of cattle, the cattle parts to be removed, and other standards for human consumption.

The current process involves hanging the deceased animal, completely removing the head of the deceased animal, and cutting the animal open to expose the backbone. Once the backbone is exposed, the operator must remove a piece of the backbone and blow the spinal cord out of the deceased animal. The head of the animal must be opened and the brain removed as well. This is a time consuming, messy, and wasteful process that costs the owner of the deceased animal time and money.

SUMMARY

In general, the disclosure is directed to a method for extracting the spinal cord and/or brain of a deceased animal without needing to remove the head or any vertebrae of the deceased animal. The operator perforates a skull of the deceased animal by creating a perforation in the skull, using a tool such as a drill, an augur, or other like device, the perforation leading into a cranial cavity of the deceased animal. The operator removes a brain from the cranial cavity of the deceased animal through the perforation in the skull. The operator then inserts a tube through the perforation in the skull and into a spinal cavity of the deceased animal. The operator then uses the tube to remove a spinal cord from the spinal cavity of the deceased animal.

By not having to completely remove the head of the deceased animal, the processing of the deceased animal involves a great deal less waste than previous processes. The process described herein also generates less mess than prior techniques, as the loss of blood experienced by removing the head of the deceased animal can be great. This reduces the risk of cross contamination between carcasses during rendering. The process described herein also greatly reduces the amount of time it takes an operator to remove the spinal cord of an animal, thereby improving numerous aspects of the deceased animal processing procedure. The process and device described herein also reduces the need for an operator to utilize knives during the rendering process, which further reduces the risk of injury during processing, which could otherwise involve dangerous knife work on the cattle carcasses.

The details of one or more examples of the disclosure are set forth in the accompanying drawings and the description below. Other features, objects, and advantages of the disclosure will be apparent from the description and drawings, and from the claims.

One embodiment includes a method for removing a spinal cord from a deceased animal, the method comprising a step of perforating a skull of the deceased animal by creating a perforation in the skull, the perforation leading into a cranial cavity of the deceased animal. The method also includes removing a brain from the cranial cavity of the deceased animal through the perforation in the skull, inserting a tube through the perforation in the skull and into a spinal cavity of the deceased animal, and removing, using the tube, a spinal cord from the spinal cavity of the deceased animal.

In a further embodiment of the method, perforating the skull comprises drilling, using a drill, into the skull to create a perforation.

In a further embodiment of the method, removing the brain from the cranial cavity comprises inserting an extraction tool into the perforation. The extraction tool comprising one or more of a hand of an operator, a hand tool, or a power tool. The method also includes physically extracting the brain from the cranial cavity through the perforation using the extraction tool.

In a further embodiment of the method, removing the brain from the cranial cavity comprises placing a suction tool into the perforation. The method includes activating the suction tool to suck the brain out of the cranial cavity through the perforation, wherein the suction tool comprises a powered vacuum system.

In a further embodiment of the method, the tube comprises a water hose. Removing the spinal cord from the spinal cavity comprises, while or after inserting the water hose into the spinal cavity, activating a water source connected to the water hose to begin a flow of water through the water hose. The method also includes spraying the water out of the water hose and into the spinal cavity.

In a further embodiment of the method, spraying the water out of the water hose and into the spinal cavity flushes and cleans the spinal cavity.

A further embodiment of the method comprises creating a backflow of the water back towards the cranial cavity by spraying the water out of the water hose and into the spinal cavity.

In another embodiment of the method, the water hose comprises a high-pressure water hose. The water source comprises a powered high-pressure water pump device. A jetter nozzle is attached to one end of the high-pressure water hose.

In a further embodiment of the method, the method comprises activating a suction tool at least partially placed in the cranial cavity of the deceased animal to remove one or more of the spinal cord from the cranial cavity after the spinal cord has been removed from the spinal cavity, and any water that flows back into the cranial cavity from the spinal cavity.

In a further embodiment of the method, the tube comprises one or more of a manual drain snake, a powered-drain snake, or a drain snake attached to a drilling tool.

In a further embodiment of the method, the deceased animal is positioned in one of a laying position or a hanging position.

In a further embodiment of the method, the method includes inserting a plug into the perforation in the skull, wherein the plug includes one or more of a receiver for the tube, a receiver for a suction tool, and a built-in vacuum system.

In some examples, the spinal cord removal device comprises a suction tool including a tube, a high-pressure water hose connected to a water source, and a jetter nozzle attached to one end of the water hose.

In a further example of the device, a portion of the water hose is housed in the suction tube.

In a further example of the device, the suction tool comprises one or more of a powered vacuum system or a manual suction system.

In a further example of the device, the water source comprises a powered high-pressure water pump device.

In a further example of the device, the device further comprises a plug, wherein the plug includes a receiver for the tube, and a receiver for the suction tool.

In a further example of the device, the device further comprises a built-in vacuum system.

In a further example of the device, activating the water source to spray water out of the high-pressure water hose and into the spinal cavity flushes and cleans the spinal cavity.

In a further example of the device, the flow of water out the water hose and into the spinal cavity creates a backflow of water towards the cranial cavity.

BRIEF DESCRIPTION OF DRAWINGS

The following drawings are illustrative of particular examples of the present disclosure and therefore do not limit the scope of the invention. The drawings are not necessarily to scale, though examples can include the scale illustrated, and are intended for use in conjunction with the explanations in the following detailed description wherein like reference characters denote like elements. Examples of the present disclosure will hereinafter be described in conjunction with the appended drawings.

DETAILED DESCRIPTION

The following detailed description is exemplary in nature and is not intended to limit the scope, applicability, or configuration of the techniques or systems described herein in any way. Rather, the following description provides some practical illustrations for implementing examples of the techniques or systems described herein. Those skilled in the art will recognize that many of the noted examples have a variety of suitable alternatives.

Figure 1:
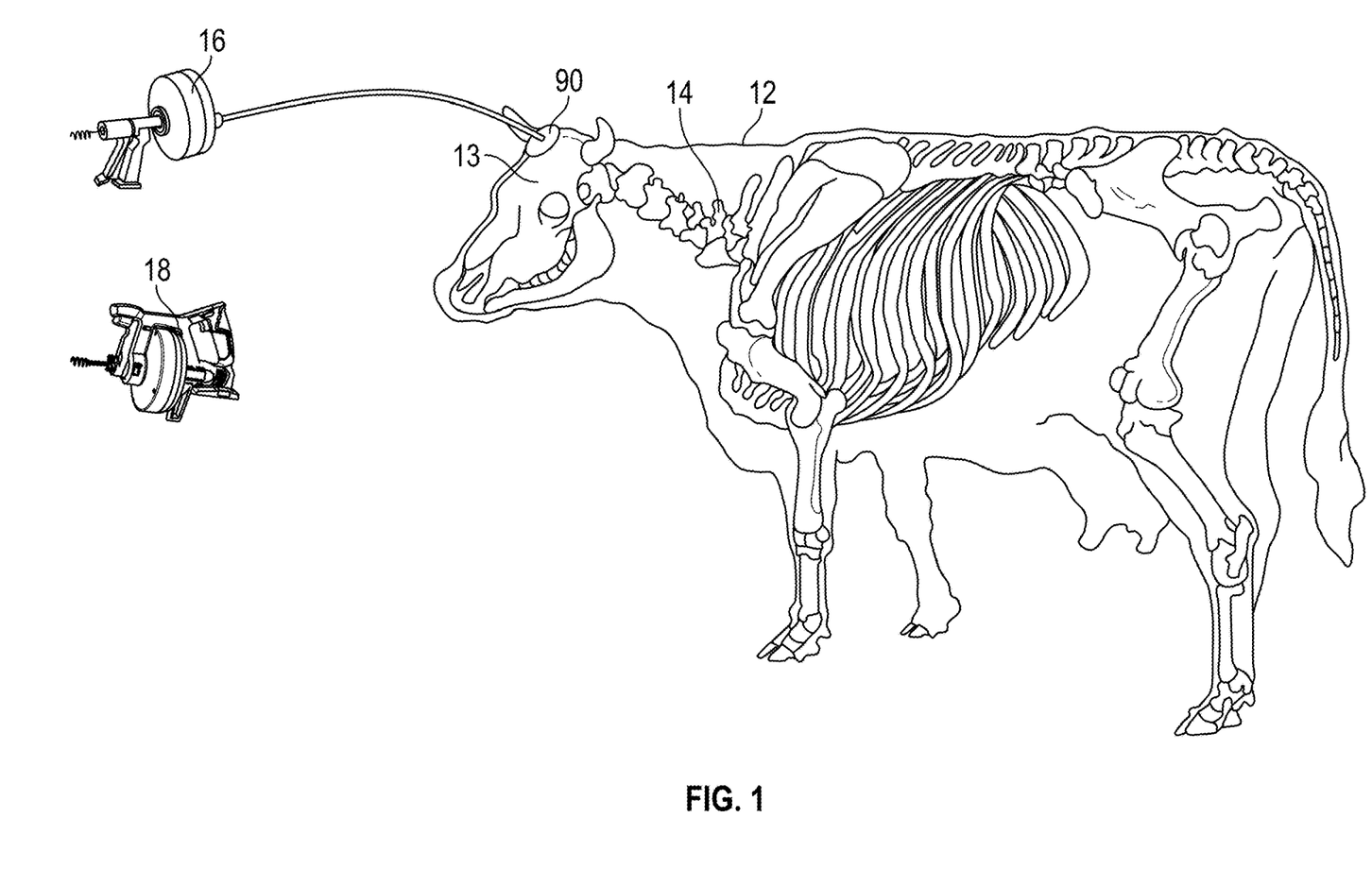
FIG. 1 is a conceptual diagram illustrating a skeletal structure of a cow and tools used to remove a spinal cord from the cow when the cow is deceased, in accordance with the techniques described herein.

FIG. 1 is a conceptual diagram illustrating a skeletal structure of a cow 12 and tools 16, 18 used to remove a spinal cord from the cow 12 when the cow 12 is deceased, in accordance with the techniques described herein. Although FIG. 1 includes a cow 12, the techniques described herein may be used with any vertebrate animal, so long as the rendering of such an animal is legal, that may be processed in the manner described herein.

The deceased animal may be positioned in one of a laying position or a hanging position (e.g., hoisted from the rear legs) for optimal results, but the techniques described herein may be applicable to deceased animals in other positions so long as the head of the deceased animal is accessible.

Figure 2A:
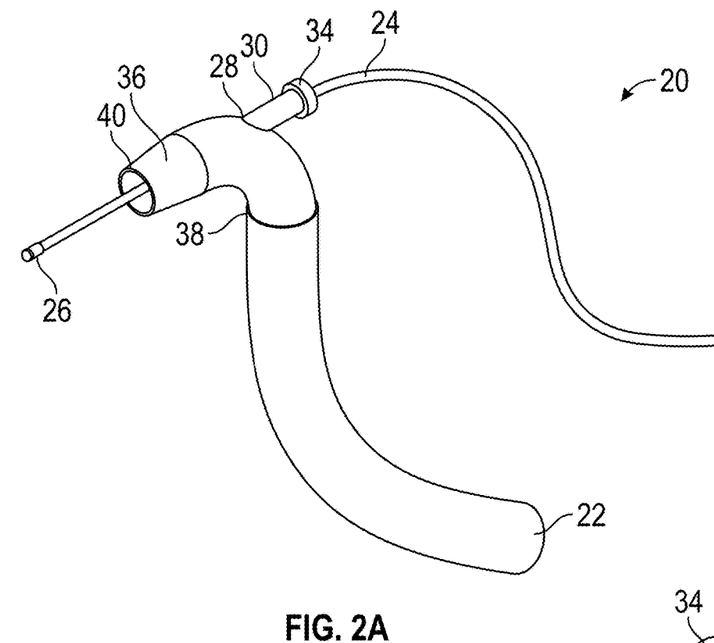
FIG. 2A is a perspective view of a spinal cord removal device used to perform the techniques described herein.

FIG. 2A shows a device 20 may be used by a user to remove the spinal cord from the cow 12. The device 20 can include a suction tool including a tube 22 (also referred to herein as a "suction tool tube" and a "suction tube"), a high-pressure water hose (also referred to herein as a "water hose") 24 connected to a water source, and a jetter nozzle 26 attached to one end of the water hose 24.

The water hose 24 can be configured to fit within the tube 22 of the suction tool. The tube 22 of the suction tool can have a diameter. The water hose 24 can have a diameter. The diameter of the suction tool tube 22 can be larger than the diameter of the water hose 24. The water hose 24 and jetter nozzle 26 can protrude from an end of the tube 22. In some embodiments, the water hose 24 can be made of rubber and/or flexible metal. In some examples, the tube 22 can be made from plastic and/or rubber.

Figure 2B:
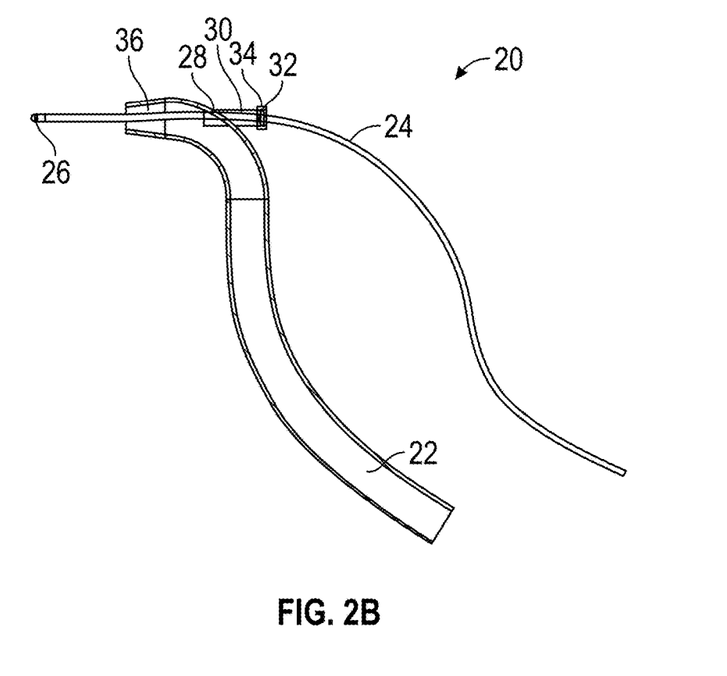
FIG. 2B and FIG. 2C are side and rear ross-sectional views, respectively, of a spinal cord removal device used to perform the techniques described herein.
Figure 2C:
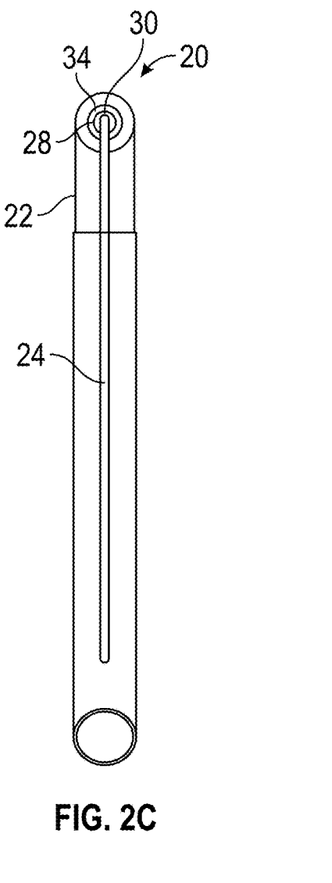

FIG. 2B and FIG. 2C show a side cross-section view and rear view of the device 20, respectively. In some embodiments, a portion of the water hose 24, entry structure 30, and/or plug 30 can be housed in the suction tube 22. As the water entering the water hose 24 comes from a separate device than the suction device providing suction to tube 22, the air provided to the tube 22 can clear water and other materials, which can reduce the need for the device 20 to be cleaned by a user. This also reduces the risk of the device 20 becoming clogged during use.

A first portion of the water hose 24 can be located within the suction tool tube 22. A second portion of the water hose 24 can be located outside of the suction tool tube 22. The water hose 24 can be positioned in the suction tool tube 22 through an opening or port 28 in the suction tube 22.

The entry location or port 28 of the suction tool tube 22 can comprise a variety of features. For example, an entry port or opening 28 may permit passage of the water hose 24 into the suction tool tube 22. The entry port or opening 28 may be configured to accommodate an entry structure 30. A seal 32 may be housed within the entry structure 30, sealing the entry structure 30 to the water hose 24. The entry structure 30 can include a raised rim 34 at one end of the entry structure 30. The raised rim can be at the opposite end of the entry opening or port 28. The seal 32 may be housed in the entry structure 30 at the location of the raised rim, as shown in FIG. 2B.

The seal 32 of the device can have a variety of uses. At the location where the water hose 24 enters the water hose entry structure 30, the seal 32 may attach and position the water hose 24 in the entry structure 30. This effectively positions and attaches the water hose 24 to the tube 22. The seal 32 may be made of rubber, or other sealing materials. The seal 32 may prevent the flow of fluid or other matter, such as the spinal cord of a deceased animal, out of the opening 28 of the suction tube 22 or the entry structure 30.

Seal 32 and entry structure 30 may be designed such that water hose 24 is slidably disposed through seal 32, into entry structure 30, and through suction tube 22 and out of suction tube head 36. In this way, the length of water hose 24 that extends out of suction tube head 36 and into the deceased animal can very, enabling the water hose to 24 to extend into the deceased animal to ensure complete and effective cleaning and spinal cord removal, while also maintaining the seal 32 to ensure that animal parts do not kick back out of entry structure 30.

The suction tool tube 22 can be made of multiple materials. In some embodiments, the tube 22 can be made of rubber or a pliable plastic. A portion of the tube may be made from a hard, inflexible plastic. This portion can include the portion of the tube 22 at which the water hose enters the suction tube, forming an inflexible suction tube head 36. The inflexible suction tool head can assist in directing the suction tool tube and jetter nozzle through the spinal cavity of an animal.

The suction tube head 36 can comprise a variety of features. The opening or port 28 can be located within the suction tube head 36. In some embodiments, the entry structure 30 can be made of the same material as the suction tube head 36, or suction tube head 36 may be a different material than entry structure 30. The suction tube head 36 can have a first end 38 and a second end 40. The first end 38 can be configured to be attached to the suction tool tube 22. The second end can include an opening through which the water hose 24 and jetter nozzle 26 exit therethrough. The second end 40 can be the shape of a truncated cone.

The jetter nozzle 26 can direct the flow of water both forwardly and rearwardly during application. A series of holes can be placed on the jetter nozzle 26 to direct the flow of water in this manner. The holes may face forwardly or rearwardly, such that the holes face the suction tool tube 22. In this way, when water hose 24 is slidably disposed through suction tube head 36, the jetter nozzle 26 can accomplish multiple tasks without human intervention. The high-pressure stream flowing forwardly out of jetter nozzle 26 can break down material in front of jetter nozzle 26, such as the spinal cord that is further down within the spine that a current location of jetter nozzle 26. At the same time, the high-pressure stream flowing rearwardly out of jetter nozzle 26 can push loose material back into the cranial cavity of the animal, where a suction tool can suck that material through suction tube head 36 and into suction tool tube 22. Also, the high-pressure stream flowing rearwardly out of jetter nozzle 26 can propel the water hose 24 through the spinal cavity, removing the entire spinal cord of the animal with minimal human intervention.

Figure 5:
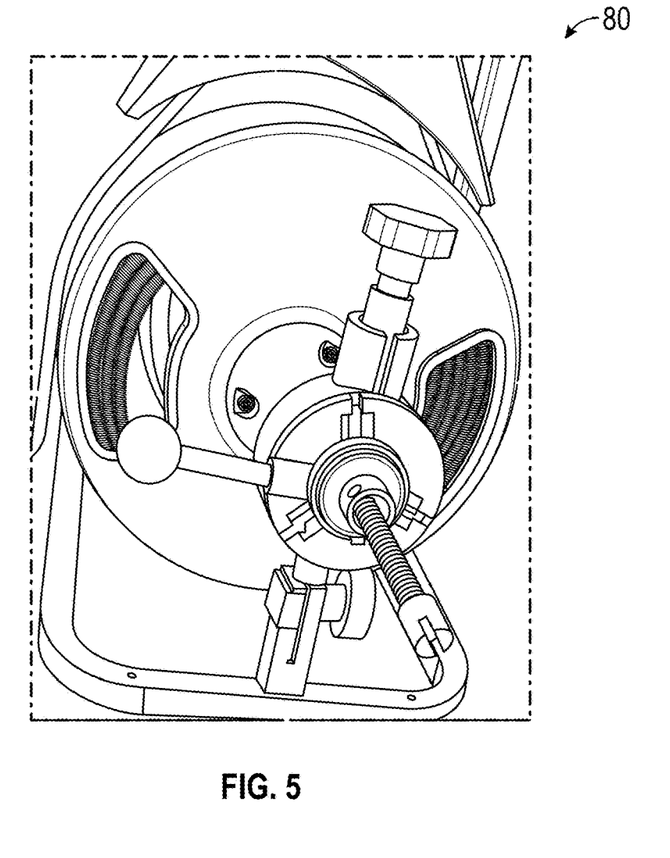
FIG. 5 is an image of a powered water source used to perform the techniques described herein.

FIG. 5 shows an exemplary powered high-pressure water pump device 80 (also referred to herein as a "high-pressure water pump device" and "commercial water pressure device" and "powered water source"). In some embodiments, the water source of the device can include a powered high-pressure water pump device 80. The high-pressure water pump device 80 can be a pressure washer or a water pressure cleaner. The high-pressure water pump device 80 can operate at pressures of approximately 800-1200 psi. These pressures can be adjusted to accommodate for the level of decomposition of the carcass, which may require higher or lower pressures be applied. The device can be compatible with any commercial water pressure device 80 available for purchase by a user. The water used with the device can be hot water. In some uses, the water can be a temperature ranging from approximately 140 degrees to 160 degrees. The water temperature can be adjusted to be increased or decreased. Hot water, when combined with brain and spinal cord matter, can reduce the viscosity of the brain and spinal cord matter. This reduces the risk of the brain and spinal cord matter attaching to the spinal cavity, cranial cavity, and device 20 during use. Further, carcasses may require rendering in cold temperatures. The use of hot water may thaw frozen carcass parts such as the brain and spinal cord during removal, making it easier to remove said parts.

Some embodiments can include a built-in vacuum system. The suction provided by the vacuum system can remove water and detritus, such as the spinal cord, from the spinal cavity. The use of the vacuum system effectively cleans the spinal cavity When the device is in use, the device can be used to remove a spinal cord from a deceased animal. Activating the water source can spray water out of the high-pressure water hose and into the spinal cavity. This flushes and cleans the spinal cavity. Introducing water at a high pressure into the spinal cavity moves spinal cord material throughout the spinal cavity.

The direction of the flow of water can determine where, within the spinal cavity, the mixture of water and spinal cord material moves. In some embodiments, the flow of water out the water hose and into the spinal cavity creates a backflow of water towards the cranial cavity. By moving the mixture toward the cranial cavity, the water can be introduced into the tube 22. The tube 22 can be used for function, and, by introducing the mixture into the tube 22, the mixture can be collected for disposal.

Figure 3:
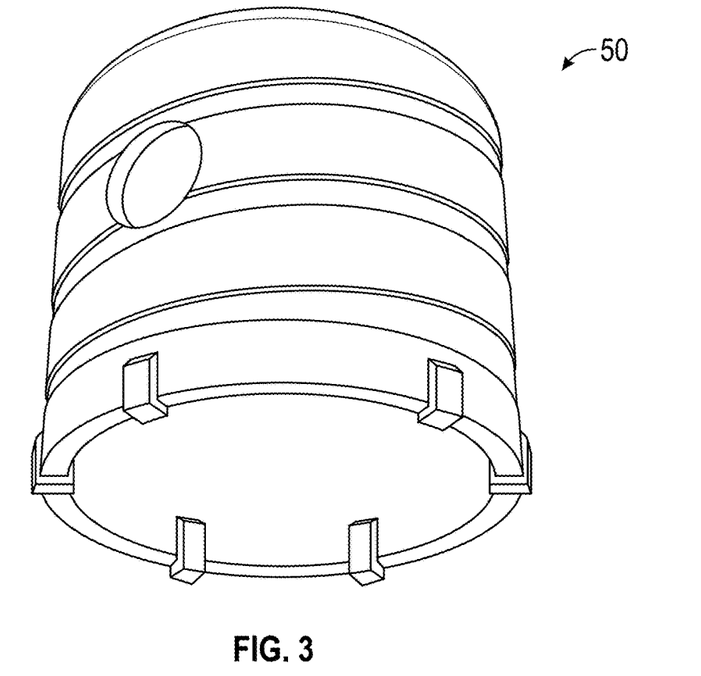
FIG. 3 is an image of an example drill bit used to perform the techniques described herein.
Figure 4:
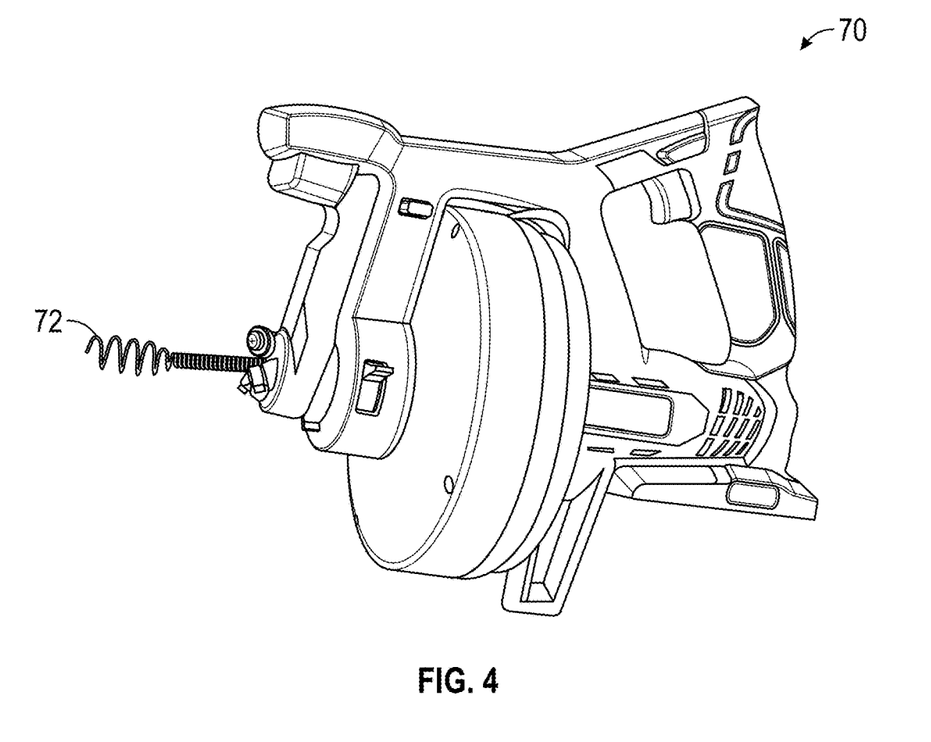
FIG. 4 is an image of an example drain auger used to perform the techniques described herein.

Returning to FIG. 1, in order to remove a spinal cord from a deceased animal in accordance with the techniques described herein, an operator may perforate a skull 13 of the deceased animal by creating a perforation in the skull 13, the perforation leading into a cranial cavity of the deceased animal. The perforation may be as large as needed to adequately remove a brain from the cranial cavity, such as 1.5 inches, 2.5 inches, 3.5 inches, or any other adequate size. In some instances, in perforating the skull, the operator may drill 18, using a drill 18, into the skull 13 to create perforation. In other instances, a different tool, such as a saw or any other tool capable of creating a hole in a skull of an animal, may be used. In instances where a drill 18 is used, certain drill bits may be used to ensure that the drill 18 can perforate the hard bone of the skull 13, such as a bi-metal hole saw, carbide hole saw, or a diamond-tipped bit. Use of a bi-metal hole saw can increase the efficiency and the longevity of the device 20. Additionally, the drill 18 be any drill 18 powerful enough to perforate the hard bone of the skull 13, such as a high-torque hand drill, an auger, or a hammer drill. FIG. 3 is an image of an example drill bit 50 used to perform the techniques described herein. FIG. 4 is an image of an example drain auger 70 used to perform the techniques described herein. The drain auger 70 can include a funnel-shaped tool 72 to create the perforation in the skull.

Figure 7:
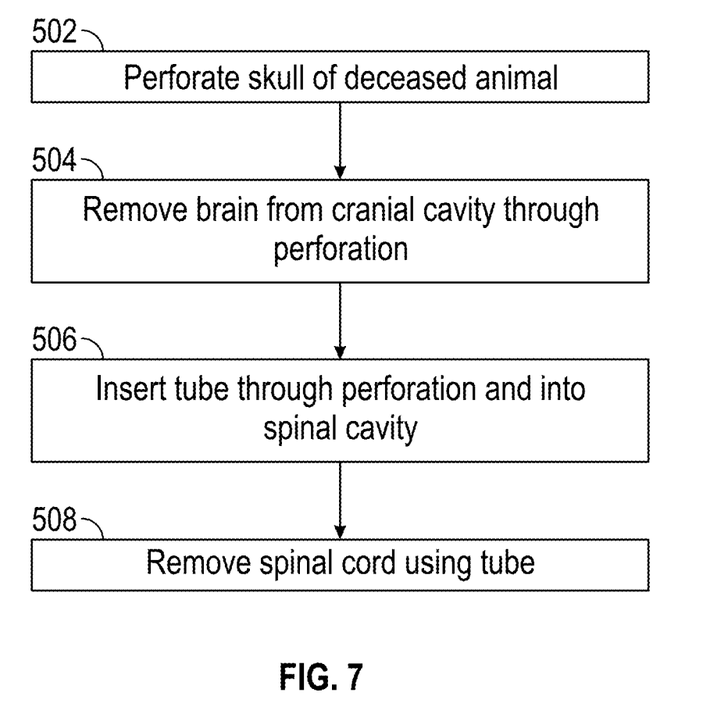
FIG. 7 is a flow chart illustrating an example method for removing a spinal cord from a deceased animal, in accordance with the techniques described herein.

The operator may further remove a brain from the cranial cavity of the deceased animal through the perforation in the skull, as discussed in FIG. 7. In some instances, the operator may use an extraction tool to perform the brain removal step, such as a hand of an operator, a hand tool (e.g., a hook, a cork screw, a drain snake, etc.), or a power tool. In such instances, the operator would physically extract the brain from the cranial cavity through the perforation using the extraction tool.

In other instances, in removing the brain from the cranial cavity, the operator may place a suction tool into the perforation. The suction tool may be a powered vacuum system or a manual suction system, such as a plunger or a suction bulb. The operator may activate the suction tool to suck the brain out of the cranial cavity through the perforation, such as by placing a hose of a powered vacuum system over the perforation and turning on the powered vacuum system.

The operator may then insert a tube 22 through the perforation in the skull 13 and into a spinal cavity 14 of the deceased animal and remove, using the tube 22, a spinal cord from the spinal cavity 14 of the deceased animal. In some instances, the tube 22 may be any one or more of a manual drain snake, a powered-drain snake, or a drain snake attached to a drilling tool. In some examples, a reamer may also be used to expand either the perforation or the entrance into the spinal cavity. In some instance, the tube 22 may be inserted along with the reamer.

In other instances, the tube may be a water hose 24. The water hose 24 may be rigid enough to easily slide down a spinal cavity 14, while also being flexible enough to account for natural curves in a body, such as through the neck and tail areas. Examples of water hoses 24 include hydraulic hoses with a steel braid and seamless polyester double braided high tinsel synthetic fiber hoses. In such instances, to remove the spinal cord from the spinal cavity 14, the operator, either while or after inserting the water hose 24 into the spinal cavity, may activate a water source connected to the water hose to begin a flow of water through the water hose 24. The operator may then spray the water out of the water hose 24 and into the spinal cavity 14. This may cut the brain and spinal cord material into smaller pieces, as well as flush and clean the spinal cavity 14. Spraying the water out of the water hose 24 and into the spinal cavity 14 may also, in some instances, create a backflow of the water back towards the cranial cavity by spraying the water out of the water hose 24 and into the spinal cavity 14. This backflow may exert force on the spinal cord, moving the spinal cord towards the cranial cavity for removal through the perforation. As the water hose moves further towards the base of the spinal cord, the continued force may completely remove the entirety of the spinal cord.

In some instances, the water hose 24 may be a high-pressure water hose, and the water source comprises a powered high-pressure water pump device (e.g., a pressure washer or a power water cleaner). FIG. 5 is an image of a powered water source 80 used to perform the techniques described herein. To accentuate the backflow, particular nozzles may be used with this system, such as a jetter nozzle 26 attached to one end of the high-pressure water hose 24.

In some examples, the water-based extraction method may be coupled with a suction tool, such as a powered vacuum system. The operator may activate the suction tool, which may at least partially be placed in the cranial cavity of the deceased animal. The suction tool, when activated may remove solids and fluids that are in the cranial cavity, including the spinal cord after the spinal cord has been removed from the spinal cavity and any water that flows back into the cranial cavity from the spinal cavity.

Figure 6:
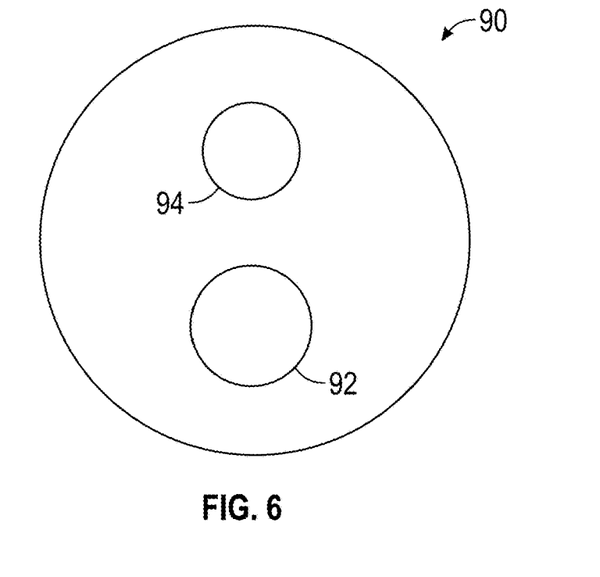
FIG. 6 is a top-down view of a plug used to perform the techniques herein.

In some examples, the operator may further use a plug 90. The operator may insert the plug 90 into the perforation in the skull. The plug 90 may include one or more of a receiver for the tube 92 and a receiver for a suction tool 94. Some embodiments can include a built-in vacuum system. In this way, the mess created by animal parts exiting the perforation but not being caught by a suction tool is reduced. FIG. 6 shows a plug 90 that can be included in some embodiments of the device. The plug can include a receiver for the tube 92 and a receiver for the suction tool 94. The receiver can include an opening for the water hose and the tube. In some embodiments, the receiver for the tube 92 can be the same size as the receiver for the suction tool 94. In other embodiments, the receivers can be different sizes.

By not having to completely remove the head of the deceased animal, the processing of the deceased animal involves a great deal less waste than previous processes. The process described herein also generates less mess than prior techniques, as the loss of blood experienced by removing the head of the deceased animal can be great. The process described herein also greatly reduces the amount of time it takes an operator to remove the spinal cord of an animal, thereby improving numerous aspects of the deceased animal processing procedure.

While the techniques described herein include the benefit of not having to remove the deceased animal's head, a portion of the techniques described herein may still be applied to animals where the head has been removed. This may be helpful in colder temperatures, which can result in the freezing of the brain. When the brain is completely frozen, the head can be removed and discarded. If the head of the deceased animal has been removed, the operator may still place the tube within the spinal cavity through the top of the spine and use the tube to remove the spinal cord from the spinal cavity. This still has the benefit over previous techniques of reducing the time and cost to remove the spinal cord rather than having to remove vertebrae from the spine and to blow out other portions of the spine in order to remove the spinal cord. In other words, while the overall process described herein may see the largest improvement when the deceased animal is, initially, fully intact, the techniques described herein may still provide benefits when the head of the deceased animal has been removed. Optionally, after the head of the deceased animal has been removed, the operator may then use the suction or removal tool to clear or rinse the skull of the deceased animal. In this process, the device 20 can be inserted into the skull 13 through an opening in the rear of the skull 13, eliminating the need to perforate the skull 13.

FIG. 7 is a flow chart illustrating an example mode of operation. An operator may perforate a skull of the deceased animal by creating a perforation in the skull, the perforation leading into a cranial cavity of the deceased animal (502). The operator may remove a brain from the cranial cavity of the deceased animal through the perforation in the skull (504). The operator may insert a tube through the perforation in the skull and into a spinal cavity of the deceased animal (506). The operator may remove, using the tube, a spinal cord from the spinal cavity of the deceased animal (508).

It is to be recognized that depending on the example, certain acts or events of any of the techniques described herein can be performed in a different sequence, may be added, merged, or left out altogether (e.g., not all described acts or events are necessary for the practice of the techniques).

Various examples of the disclosure have been described. Any combination of the described systems, operations, or functions is contemplated. These and other examples are within the scope of the following claims.

What is claimed is:

1. A method for removing a spinal cord from a deceased animal, the method comprising:

perforating a skull of the deceased animal by creating a perforation in the skull, the perforation leading into a cranial cavity of the deceased animal;

removing a brain from the cranial cavity of the deceased animal through the perforation in the skull;

inserting a tube comprising a nozzle through the perforation in the skull and into a spinal cavity of the deceased animal, wherein the tube is connected to a water source, and wherein the nozzle is configured to direct water rearwardly;

creating at least a backflow of water toward the cranial cavity via the tube; and removing, using the tube, a spinal cord from the spinal cavity of the deceased animal.

2. The method of claim 1, wherein perforating the skull comprises drilling, using a drill, into the skull to create the perforation.

3. The method of claim 1, wherein removing the brain from the cranial cavity comprises:
inserting an extraction tool into the perforation, the extraction tool comprising one or more of a hand of an operator, a hand tool, or a power tool; and
physically extracting the brain from the cranial cavity through the perforation using the extraction tool.

4. The method of claim 1, wherein removing the brain from the cranial cavity comprises:
placing a suction tool into the perforation; and
activating the suction tool to suck the brain out of the cranial cavity through the perforation,
wherein the suction tool comprises a powered vacuum system.

5. The method of claim 1, wherein the tube comprises a water hose, wherein removing the spinal cord from the spinal cavity comprises, while or after inserting the water hose into the spinal cavity:
activating a water source connected to the water hose to begin a flow of water through the water hose;
spraying the water out of the water hose and into the spinal cavity.

6. The method of claim 5, wherein spraying the water out of the water hose and into the spinal cavity flushes and cleans the spinal cavity.

7. The method of claim 6, further comprising additionally creating a forward flow of the water into the spinal cavity by additionally spraying the water out of a front of the nozzle and into the spinal cavity.

8. The method of claim 6, wherein the water hose comprises a high-pressure water hose, and wherein the water source comprises a powered high-pressure water pump device, wherein the nozzle comprises a jetter nozzle and is attached to one end of the high-pressure water hose.

9. The method of claim 6, further comprising:
activating a suction tool at least partially placed in the cranial cavity of the deceased animal to remove one or more of:
the spinal cord from the cranial cavity after the spinal cord has been removed from the spinal cavity, and
any water that flows back into the cranial cavity from the spinal cavity.

10. The method of claim 1, wherein the tube comprises one or more of a manual drain snake, a powered-drain snake, or a drain snake attached to a drilling tool.

11. The method of claim 1, wherein the deceased animal is positioned in one of a laying position or a hanging position.

12. The method of claim 1, further comprising:
inserting a plug into the perforation in the skull, wherein the plug includes one or more of:
a receiver for the tube,
a receiver for a suction tool, and
a built-in vacuum system.

13. A spinal cord removal device, comprising:
a suction tool including a tube;
a plug, comprising:
(i) a receiver for the tube; and
(ii) a receiver for the suction tool;
a high-pressure water hose connected to a water source configured to direct a high pressure flow of water from an activated water source into a spinal cavity of a deceased animal and configured to break up a brain and spinal material of the deceased animal and flush and clean the spinal cavity, thereby creating a backflow of water toward a cranial cavity of the deceased animal; and
a jetter nozzle attached to one end of the high-pressure water hose configured to direct water rearwardly.

14. The spinal cord removal device of claim 13, wherein the water source is a hot water source.

15. The spinal cord removal device of claim 13, wherein the suction tool comprises one or more of a powered vacuum system or a manual suction system.

16. The spinal cord removal device of claim 13, wherein the water source comprises a powered high-pressure water pump device.

17. The spinal cord removal device of claim 13, further comprising a built-in vacuum system.

* * * * *